(No Model.)

A. STEPHEN.
MANUFACTURE OF BROOMS.

No. 553,365. Patented Jan. 21, 1896.

WITNESSES
F. L. Ourand
H. L. Coombs

INVENTOR
Andrew Stephen,
By Louis Bagger & Co.
Attorneys

UNITED STATES PATENT OFFICE.

ANDREW STEPHEN, OF RUSHVILLE, NEBRASKA.

MANUFACTURE OF BROOMS.

SPECIFICATION forming part of Letters Patent No. 553,365, dated January 21, 1896.

Application filed September 11, 1895. Serial No. 562,199. (No model.)

*To all whom it may concern:*

Be it known that I, ANDREW STEPHEN, a citizen of the United States, and a resident of Rushville, in the county of Sheridan and State of Nebraska, have invented certain new and useful Improvements in the Manufacture of Brooms; and I do hereby declare that the following is a full, clear, and exact description of the invention, which will enable others skilled in the art to which it appertains to make and use the same, reference being had to the accompanying drawings, which form a part of this specification.

My invention relates to improvements in brooms; and its object is to provide an improved construction of the same which shall possess superior advantages with respect to durability and efficiency in use.

The invention consists in the novel construction and combination of parts hereinafter fully described and claimed.

Figure 1:
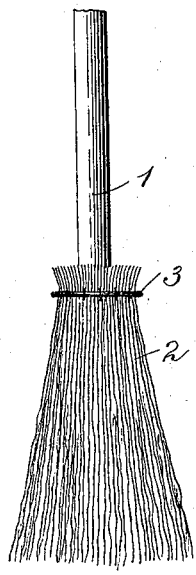
Figure 2:
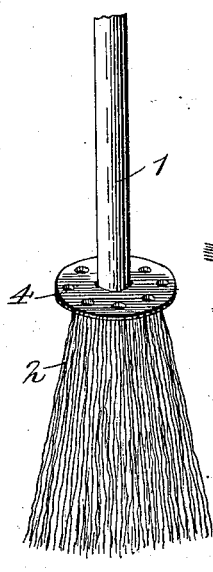
Figure 3:
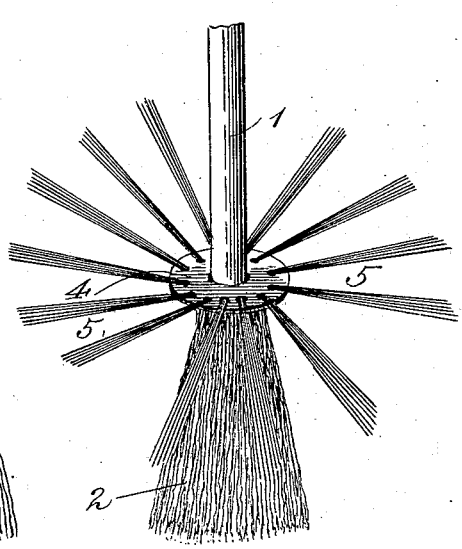
Figure 4:
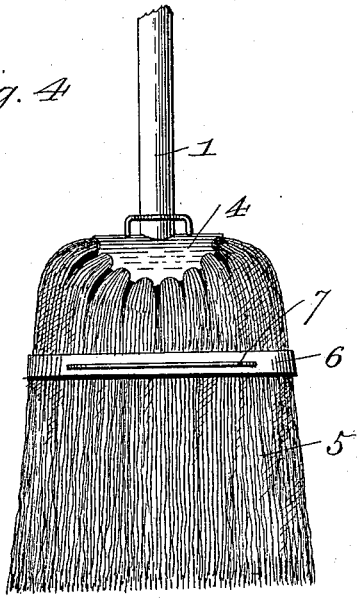

In the accompanying drawings, Figure 1 represents a side elevation showing the first step in manufacturing a broom according to my invention. Fig. 2 is a view showing the cover-holder in place. Fig. 3 is a perspective view of the cover-holder, showing the covers connected therewith. Fig. 4 is an elevation of a completed broom made according to my invention.

In the said drawings the reference-numeral 1 designates the handle; 2, the inner corn; 3, the binding-wire; 4, the cover-holder, and 5 the cover or outside corn; 6, the band, and 7 the wire for securing it in place.

In manufacturing a broom according to my invention I first take the handle and wrap the inner corn around one end thereof and secure it thereto by the wire 3, as usual. I then take the cover-holder, which consists of a disk or round plate having a central aperture and a series of holes near the periphery or edge, and slip it on the handle which passes through the central aperture. The holder will now rest upon the shoulder formed by the inner ends of the broom-corn. The ends of the cover or outer broom-corn are then passed through the holes in the plate and the latter is bent down at each side, as seen in Fig. 4. The band 6 is then wrapped around the corn and secured in place by the wire 7. I make no claim herein to said band and wire, which are disclosed in Letters Patent granted to me January 30, 1894, No. 513,837.

The cover-holder 4 is made of sheet metal, and when the covers are inserted in the holes and the holder bent down at opposite sides the corn will be securely held and prevented from getting loose. Shorter brush or corn can be employed than in the ordinary brooms, making a finer broom, and the whirl will not break at the top, as is liable to happen with ordinary brooms.

The cover-holder when stamped up out of sheet metal can be made with a central sleeve 8. The holes for the covers or outer corn may also be made oval if desired.

Having thus described my invention, what I claim is—

As an improved article, a broom comprising the handle, the inner corn secured thereto, the cover holder consisting of the sheet metal plate having a central aperture, and a series of holes, the outer corn having the inner ends passed through said holes and the said plate being bent downward at opposite sides, substantially as described.

In testimony that I claim the foregoing as my own I have hereunto affixed my signature in presence of two witnesses.

ANDREW STEPHEN.

Witnesses:
HORACE C. DALE,
JOHN K. WAHLFORD.